US008682981B2

(12) United States Patent
McCarthy et al.

(10) Patent No.: US 8,682,981 B2
(45) Date of Patent: Mar. 25, 2014

(54) SYSTEM AND METHOD FOR E-MAIL NOTIFICATION

(75) Inventors: Mary McCarthy, San Antonio, TX (US); Roland Noll, San Antonio, TX (US); Scott Pettit, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 825 days.

(21) Appl. No.: 11/655,622

(22) Filed: Jan. 19, 2007

(65) Prior Publication Data

US 2008/0177844 A1 Jul. 24, 2008

(51) Int. Cl.
*G06F 15/16* (2006.01)
*H04N 7/173* (2011.01)

(52) U.S. Cl.
USPC .......................................... 709/206; 725/110

(58) Field of Classification Search
USPC ........................................ 709/206, 218, 249
See application file for complete search history.

(56) References Cited

U.S. PATENT DOCUMENTS

| | | |
|---|---|---|
| 5,931,905 A | 8/1999 | Hashimoto et al. |
| 6,493,876 B1 | 12/2002 | DeFreese |
| 6,636,890 B1 | 10/2003 | Mandalia |
| 6,694,316 B1 | 2/2004 | Langseth et al. |
| 6,788,769 B1 * | 9/2004 | Waites ........................ 379/93.24 |
| 6,981,275 B1 | 12/2005 | Maeda et al. |
| 7,275,095 B1 * | 9/2007 | Lebouill ........................ 709/223 |
| 2002/0147988 A1 * | 10/2002 | Nakano .......................... 725/134 |
| 2003/0002634 A1 * | 1/2003 | Gupta et al. ............... 379/88.13 |
| 2004/0093619 A1 | 5/2004 | Cox |
| 2004/0215736 A1 * | 10/2004 | Kortan et al. .................. 709/207 |
| 2005/0149966 A1 | 7/2005 | Fairhurst et al. |
| 2006/0089843 A1 | 4/2006 | Flather |
| 2006/0146788 A1 * | 7/2006 | Brown et al. .................. 370/352 |
| 2006/0179466 A1 * | 8/2006 | Pearson et al. ................ 725/109 |
| 2007/0113101 A1 * | 5/2007 | LeVasseur et al. ............ 713/189 |
| 2007/0123253 A1 * | 5/2007 | Simongini et al. ............ 455/433 |
| 2007/0250884 A1 * | 10/2007 | Qiu et al. ....................... 725/106 |
| 2008/0109839 A1 * | 5/2008 | Bruce et al. ...................... 725/25 |
| 2010/0017816 A1 * | 1/2010 | Martini et al. .................. 725/31 |

FOREIGN PATENT DOCUMENTS

WO WO-0133858 5/2001

* cited by examiner

*Primary Examiner* — Shaq Taha
(74) *Attorney, Agent, or Firm* — Toler Law Group, PC

(57) ABSTRACT

A method to deliver a notification of receipt of an e-mail includes associating a set-top box identifier with at least one e-mail account. Through a mail server external to an IPTV network, it is determined whether an e-mail has been received for the at least one e-mail account. In response to determining that an e-mail has been received for the at least one e-mail account, an e-mail delivery notification is generated and transmitted to the e-mail delivery notification to a set-top box device identified by the set-top box identifier.

24 Claims, 7 Drawing Sheets

SYSTEM AND METHOD FOR E-MAIL NOTIFICATION

FIELD OF THE DISCLOSURE

The present disclosure relates generally to delivering e-mail message notifications to set-top box devices in an Internet Protocol Television (IPTV) system.

BACKGROUND

Television viewing is part of daily life. Many individuals prefer not be interrupted while watching television, but they may desire to monitor e-mails while watching television. For example, an individual may want to receive a notification that an e-mail message has been received from a particular sender. Receipt of such notifications via a set-top box device may be useful especially in circumstances where the e-mail account service provider does not form part of an Internet Protocol Television (IPTV) system of which the set-top box forms a part.

BRIEF DESCRIPTION OF THE DRAWINGS

Embodiments are illustrated by way of example and not limitation in the figures of the accompanying drawings, in which.

DETAILED DESCRIPTION OF THE DRAWINGS

A method for delivering a notification of receipt of an e-mail is disclosed. The method may include receiving an e-mail notification request from a set-top box device forming part of an Internet Protocol Television (IPTV) network, where the e-mail notification request comprises a set-top box identifier to identify the set-top box device. The method may further include associating the set-top box identifier with at least one e-mail account and determining, through a mail server external to the IPTV network, whether an e-mail has been received for the at least one e-mail account. In response to determining that an e-mail has been received for the at least one e-mail account, an e-mail delivery notification may be generated and transmitted to the set-top box device.

In another embodiment, a system to deliver a notification of receipt of an e-mail is disclosed. An identity management module, that may form part of a notification server, is to receive an e-mail notification request from a set-top box device forming part of an Internet Protocol Television (IPTV) network. As mentioned, the e-mail notification request may comprise a set-top box identifier to identify the set-top box device. The identity management module is further to associate the set-top box identifier with at least one e-mail account. An e-mail access module is provide, the e-mail access module is to determine, through a mail server external to the IPTV network, whether an e-mail has been received for the at least one e-mail account. A notification message generator module is to generate an e-mail delivery notification, in response to the e-mail access module determining that an e-mail has been received for the at least one e-mail account. A message transfer module transmits the e-mail delivery notification to the set-top box device.

Figure 1:
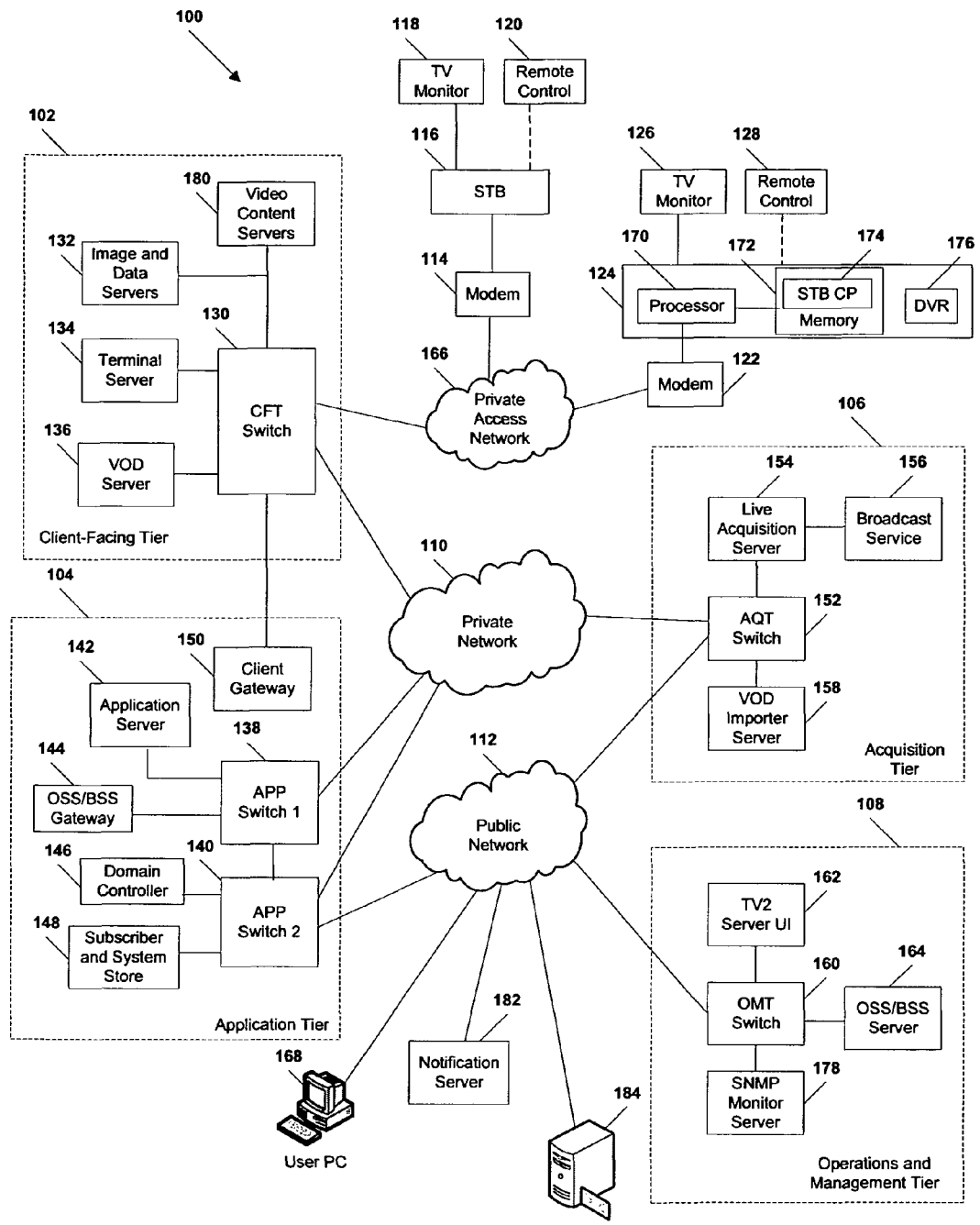
FIG. 1 is a block diagram representative of an Internet Protocol Television (IPTV) system, in accordance with an example embodiment, over which an e-mail notification can be sent, and also, over which television content can be sent and received.

Referring to FIG. 1, an illustrative embodiment of an Internet Protocol Television (IPTV) system that may be used to provide video content by sending and receiving data packets is illustrated and is generally designated 100. An e-mail notification message may be provided to a set-top box device in the IPTV system, in accordance with an example embodiment.

As shown, the system 100 may include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112. It is also shown that the public network 112 is coupled to a user personal computer (PC) 168 which is external to the IPTV system 100. The public network 112 is further coupled to a notification server 182 and a mail server 184.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV) access network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122.

The client-facing tier 102 can communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that can be supported by networking the client-facing tier 102 to numerous set-top box devices. In an illustrative embodiment, the client-facing tier, or any portion thereof, can be included at a video head-end office.

In a particular embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device can communicate with a second remote control 128.

In an exemplary, non-limiting embodiment, each set-top box device 116, 124 can receive video content, which may include video and audio portions, from the client-facing tier 102 via the private access network 166. The set-top boxes 116, 124 can transmit the video content to an external display device, such as the television monitors 118, 126. Further, the set-top box devices 116, 124 can each include a STB processor, such as STB processor 170, and a STB memory device, such as STB memory 172, which is accessible to the STB processor 170. In one embodiment, a computer program, such as the STB computer program 174, can be embedded within the STB memory device 172. Each set-top box device 116, 124 can also include a video content storage module, such as a digital video recorder (DVR) 176. In a particular embodiment, the set-top box devices 116, 124 can communicate commands received from the remote control devices 120, 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more image and data servers 132 that store still images associated with programs of various IPTV channels. The image and data servers 132 can also store data related to various channels, e.g., types of data related to the channels and to programs or video content displayed via the channels. In an illustrative embodiment, the image and data servers 132 can be a cluster of servers, each of which can store still images, channel and program-related data, or any combination thereof. The CFT switch 130 can also be coupled to a terminal server 134 that provides terminal devices with a connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers via their set-top boxes 116, 124. In an illustrative, non-limiting embodiment, the video content servers 180 can include one or more multicast servers.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway can provide or restrict access to an OSS/BSS server 164 that stores operations and billing systems data.

Further, the second APP switch 140 can be coupled to a domain controller 146 that provides web access, for example, to users via the public network 112. For example, the domain controller 146 can provide remote web access to IPTV account information via the public network 112, which users can access using their personal computers 168. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly with the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the IPTV system 100 via the private access network 166, using information received from the client gateway 150. In this embodiment, the private access network 166 can provide security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. In one embodiment, the OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to an unauthorized twisted pair, the client gateway 150 can block transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television or movie content, for example, from a broadcast service 156. In a particular embodiment during operation of the IPTV system, the live acquisition server 154 can acquire television or movie content. The live acquisition server 154 can transmit the television or movie content to the AQT switch 152, and the AQT switch 152 can transmit the television or movie content to the CFT switch 130 via the private network 110.

Further, the television or movie content can be transmitted to the video content servers 180, where it can be encoded, formatted, stored, or otherwise manipulated and prepared for communication to the set-top box devices 116, 124. The CFT switch 130 can communicate the television or movie content to the modems 114, 122 via the private access network 166. The set-top box devices 116, 124 can receive the television or movie content via the modems 114, 122, and can transmit the television or movie content to the television monitors 118, 126. In an illustrative embodiment, video or audio portions of the television or movie content can be streamed to the set-top box devices 116, 124.

Further, the AQT switch can be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When user issue requests for VOD content via the set-top box devices 116, 124, the requests can be transmitted over the private access network 166 to the VOD server 136, via the CFT switch 130. Upon receiving such requests, the VOD server 136 can retrieve the requested VOD content and transmit the content to the set-top box devices 116,124 across the private access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In an illustrative embodiment, the live acquisition server 154 can transmit the television or movie content to the AQT switch 152, and the AQT switch 152, in turn, can transmit the television or movie content to the OMT switch 160 via the public network 112. In this embodiment, the OMT switch 160 can transmit the television or movie content to the TV2 server 162 for display to users accessing the user interface at the TV2 server 162. For example, a user can access the TV2 server 162 using a personal computer (PC) 168 coupled to the public network 112.

As indicated in FIG. 1, the application tier 104 is coupled to the notification server 182. The notification server 182 is to deliver a notification of receipt of an e-mail to one of the set top box devices 116, 124, via the public network 112. The notification server 182 includes memory, described in more detail below, which may be a lightweight directory access protocol (LDAP). The memory may store client or user information, which may in one example embodiment include a set top box identifier, user information or e-mail accounts associated with the set-top box identifier of the user.

Although the notification server 182 is shown as not forming part of the IPTV system 100, it will be appreciated that in one illustrative embodiment the notification server 182 may form part of the IPTV system 100. For example, the notification server 182 may be coupled to the first or second APP switch 138 or 140, or may, alternatively, form part of the application server 142. Similarly, the memory may form part of the subscriber and system store 148.

The notification server 182 is also coupled to a mail server 184 via the public network 112. The mail server 184 receives e-mail messages from the public network 112. These e-mail messages are transmitted to various user PCs, e.g., the user PC 168. As shown by FIG. 1, the mail server 184 does not form part of the IPTV system 100 and is located remote from the IPTV system 100. The mail server 184 may be managed by an external e-mail service provider.

Figure 2:
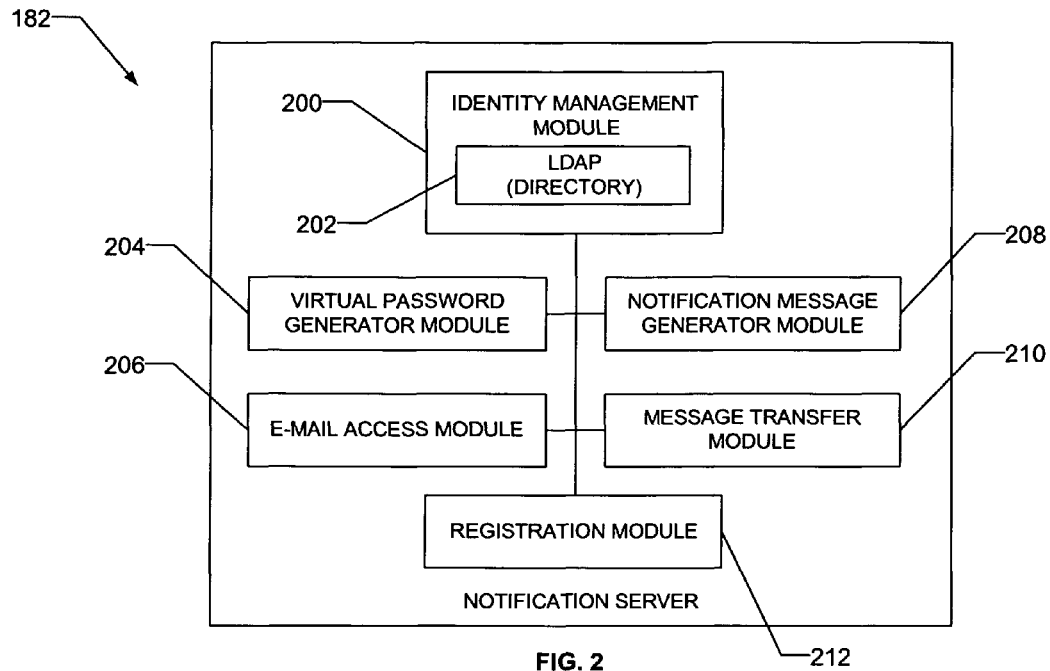
FIG. 2 is a block diagram illustrating a system, shown as a notification server, to deliver a notification of receipt of an e-mail, in accordance with an example embodiment.

Referring to FIG. 2, a block diagram illustrating the notification server 182 is shown. As mentioned, the notification server 182 is to deliver a notification of receipt of an e-mail at a mail server 184 to one of the set-top box devices 116, 124. In one example embodiment, the notification server 182 comprises an identity management module 200 configured to receive an e-mail notification request from one of the set-top boxes 116 and 124, the set-top box devices 116, 124 forming part of the IPTV system or network 100.

In an example embodiment, the computer program embedded in the STB memory device, e.g., the STB computer program 174, of the set-top box devices 116, 124 may generate the e-mail notification request and transmit the request to the notification server 182 via the private access network 166, the CFT switch 130, the private network 110, the second APP switch 140 and the public network 112. The e-mail notification request may be generated and transmitted to the notification server 182 whenever a set-top box device 116, 124 is switched on. Alternatively, or in addition, the e-mail notification request may be transmitted periodically from the set-top box devices 116, 124.

The e-mail notification request may comprise a set-top box identifier to identify the set-top box device 116, 124. The set-top box identifier may be an alphanumeric identifier with which the set-top box device 116, 124 is issued. It will be appreciated that the set-top box identifier may be any other data that is suitable for associating a set-top box device with a particular user account.

As mentioned, the identity management module 200 may store data in the form of a directory, e.g., lightweight directory access protocol (LDAP) 202. In an illustrative example embodiment, the LDAP 202 contains particular user and set-top box information to allow the identity management module 200 to link or associate a set-top box identifier with at least one e-mail account. The identity management module 200 may access the LDAP 202 to retrieve and obtain details of the e-mail account associated with the set-top box identifier. In an example embodiment, the e-mail account identifier may be an e-mail address of a particular client of the IPTV system 100 associated with the set-top box device 116, 124. For example, the e-mail account identifier may be joesoap@post.com, where Joe Soap has a contract with the IPTV service provider to provide IPTV content via one of the set-top box devices 116, 124. Joe Soap may have a separate account with post.com for providing e-mail services.

The identity management module 200 is also configured to obtain an e-mail account virtual password. In one example embodiment, each e-mail account may have an associated e-mail account virtual password stored in the LDAP 202. It will be appreciated that the e-mail account virtual password may be generated by a virtual password generator module 204 which may form part of the notification server 182. For example, once the identity management module 200 has associated the e-mail account identifier with a particular set-top box device 116, 224, the identity management module 200 may instruct the virtual password generator module 204 to generate an e-mail account virtual password. The virtual password generator module 204 may then store the generated e-mail account virtual password in the LDAP 202. As is described in more detail below, the e-mail account virtual password is used by the mail server 184 to access the e-mail account of a particular user. As the notification server 182 would not have access to the e-mail account password of the user, the mail server 184 would need confirmation that the request for information from the user's e-mail account is a valid request.

As indicated by FIG. 2, the identity management module 200 also comprises an e-mail access module 206 to determine, through the mail server 184 external to the IPTV network, whether an e-mail has been received for the at least one e-mail account. In an example embodiment, the e-mail access module 206 is to generate a further e-mail notification request to be transmitted to the mail server 184. The further e-mail notification request is presented to the mail server 184 by the e-mail access module 206 and instructs the mail server 184 to determine whether any new e-mail messages has been received for the at least one e-mail account associated with the set-top box identifier.

In one example embodiment, the e-mail access module 206 generates the further e-mail notification request by including the e-mail account identifier and the e-mail account virtual password in the further e-mail notification request. As mentioned, this information is necessary to provide the mail server 184 with sufficient information and authorization to access the e-mail account of the user associated with the set-top box device 116, 124.

The e-mail access module 206 is also configured to receive information from the mail server 184 to indicate that an e-mail has been received for the at least one e-mail account. Depending on the application, this information may merely include confirmation that an e-mail has been received in the inbox of the relevant e-mail account. Alternatively, the information may include any one or any combination of the name or e-mail address of the sender of the e-mail, the title of the e-mail, an indication on whether the e-mail has an attachment, the time the e-mail was received at the mail server 184 or the first few words of the e-mail message.

FIG. 2 further illustrates a notification message generator module 208 which is configured to generate an e-mail delivery notification based on the information received by the e-mail access module 206 from the mail server 184. A message transfer module 210 may transmit the e-mail delivery notification generated by the notification message generator module 208 to the relevant set-top box device 116, 124 for display on the television monitors 118, 126. The message transfer module 210 may transmit the e-mail delivery notification via the public network 112, the second APP switch 140, the private network 110, the CFT switch 130, the private access network 166, to, for example, the modem 122 and the set-top box device 124. The processor 170 of the set-top box device 124 may then display the e-mail delivery notification on the television monitor 126.

The process of associating the set-top box identifier with an e-mail account identifier may, in an illustrative example embodiment, be automatic, with the IPTV system 100 being managed by the same or sister service providers. In this example embodiment, the service provider will have the necessary information to automatically know that a particular set-top box device 116, 124 is associated with and linked to a particular user, which user also holds an e-mail account. This information may, for example, be available from the service provider's internal billing system.

In other example embodiments, the user of a particular set-top box device 116, 124 may want to assign additional e-mail accounts, such as e-mail accounts of other individuals living in the same residence, to the set-top box device 116, 124. In these circumstances the notification server 182 may include a registration module 212 to receive a registration request from a user associated with a set-top box device to associate an additional e-mail account with the user's set-top box device. The registration module 212 may provide for a web-interface to register the additional e-mail accounts. During the registration process the registration module 212 may request the password of the e-mail account to be registered. This password may first be validated with the mail server 184 before the additional e-mail account is to be registered.

The mail server 184 of FIG. 1 may be configured to receive the further e-mail notification request from the notification server 182. On receipt of the e-mail notification request, the mail server 184 may extract information from the further e-mail notification request to identify the relevant e-mail account and to access the e-mail account thereby to determine whether an e-mail has been received for the particular e-mail account. For example, the mail server 184 may obtain the mail account identifier and the e-mail account virtual password from the further e-mail notification request. As mentioned, the mail server 184 uses the e-mail account virtual password to confirm that the further e-mail notification request has been received from a validated source.

The mail server 184 is further configured to provide information to the notification message generator module 208 to indicate that an e-mail has been received for the identified e-mail account. The type of information may vary according to the application, but may include any one or any combination of the name or e-mail address of the sender of the e-mail, the title of the e-mail, an indication on whether the e-mail has an attachment, the time the e-mail was received at the mail server 184 or the first few words of the e-mail message.

Figure 3:
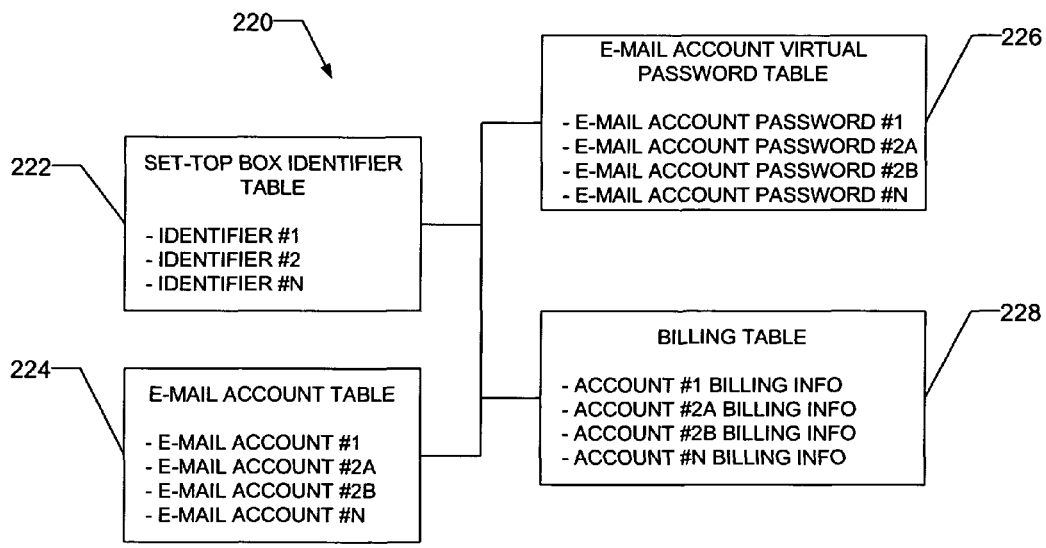
FIG. 3 is a high-level entity-relationship diagram, in accordance with an example embodiment.

FIG. 3 is a high-level entity-relationship diagram, illustrating various tables 220 that may be maintained within the LDAP 202, and that are utilized by and support the notification server 182, e.g., the identity management module 202. A set-top box identifier table 222 contains a record for each set-top box device activated in the IPTV system 100 of FIG.

1. As mentioned above, the set-top box identifiers may be an alphanumeric identifier with which the set-top box device 116, 124 is issued or the set-top box identifier may be any other data that is suitable for associating a set-top box device with a particular user account.

In an example embodiment, the tables 220 also include an e-mail account table 224 in which are maintained e-mail account identifiers to identify a number of e-mail accounts. Each e-mail account is associated with a particular set-top box identifier. In one example embodiment, the e-mail account identifiers may be e-mail addresses, e.g., johndoe@yahoo.com. In circumstances where a user, e.g., a set-top box device owner has registered additional e-mail addresses to be associated with a set-top box identifier, more than one e-mail account identifier may be maintained in the e-mail account table 224. This is shown by "E-MAIL ACCOUNT #2A" and "E-MAIL ACCOUNT #2B".

An e-mail account virtual password table 226 is also maintained in the LDAP 202. This table 226 contains virtual passwords for each e-mail account identifier. As mentioned, a virtual password generator module 204 may generate an e-mail account virtual password on instructions from the identity management module 200. The virtual password generator module 204 may store the generated e-mail account virtual passwords in the LDAP 202, for later access by the identity management module 200 or the e-mail access module 206.

In one example embodiment, the LDAP 202 may also include a billing table 228 which may include billing information on the various accounts of users. As mentioned, the billing information may be relevant to associate a particular set-top box device with a particular e-mail account.

Figure 4:
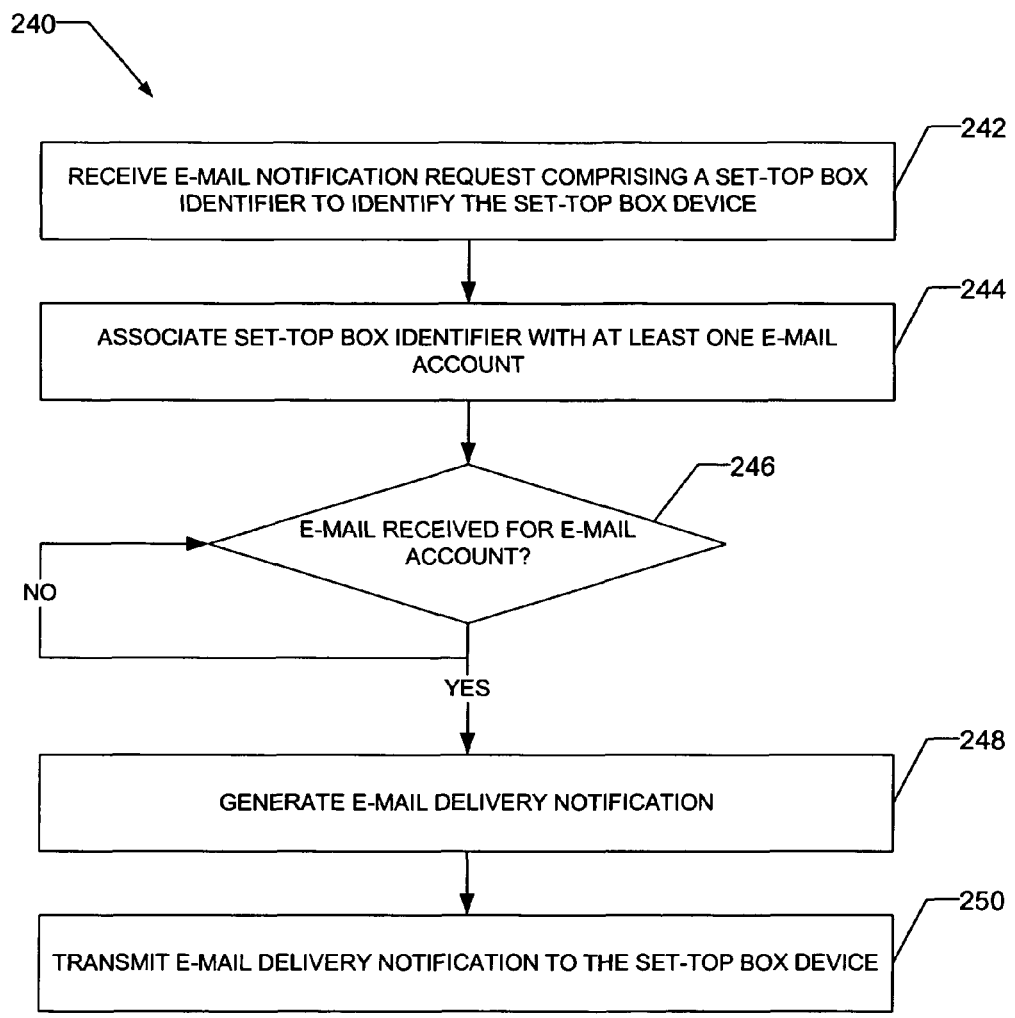
FIG. 4 is a simplified flow chart to illustrate a method to deliver a notification of receipt of an e-mail, in accordance with an example embodiment, that may be performed by the system of FIG. 1.

FIG. 4 shows a simplified flow chart to illustrate a method 240 to deliver a notification of receipt of an e-mail, according to an example embodiment. In one example embodiment, the method 240 may be implemented by the notification server 182 of FIG. 1 and FIG. 2.

As shown by block 242, an e-mail notification request is received by an identity management module 200 from a set-top box device, e.g., set top box device 124, which forms part of the IPTV network or system 100. The e-mail notification request may comprise a set-top box identifier, described above, to identify the set-top box device 124. The identity management module 200 associates the set-top box identifier with at least one e-mail account, by accessing a memory, such as LDAP 202 (shown by block 244).

As indicated by block 246, an e-mail access module 206 may now determine whether an e-mail has been received for the at least one e-mail account. The e-mail access module 206 determines whether an e-mail has been received through a mail server 184 external to the IPTV network 100. In response to determining that an e-mail has been received for the at least one e-mail account, a notification message generator module 208 generates an e-mail delivery notification (shown by block 248) which may comprise information, for example, the name or e-mail address of a sender of the e-mail. In addition, or in combination with the name or e-mail address of the sender, the notification may further comprise the title of the e-mail, an indication on whether the e-mail has an attachment, the time the e-mail was received at the mail server 184 and the first few words of the e-mail message.

A message transfer module 210 may now transmit the generated e-mail delivery notification to the set-top box device 124, as shown by block 250.

Figure 5:
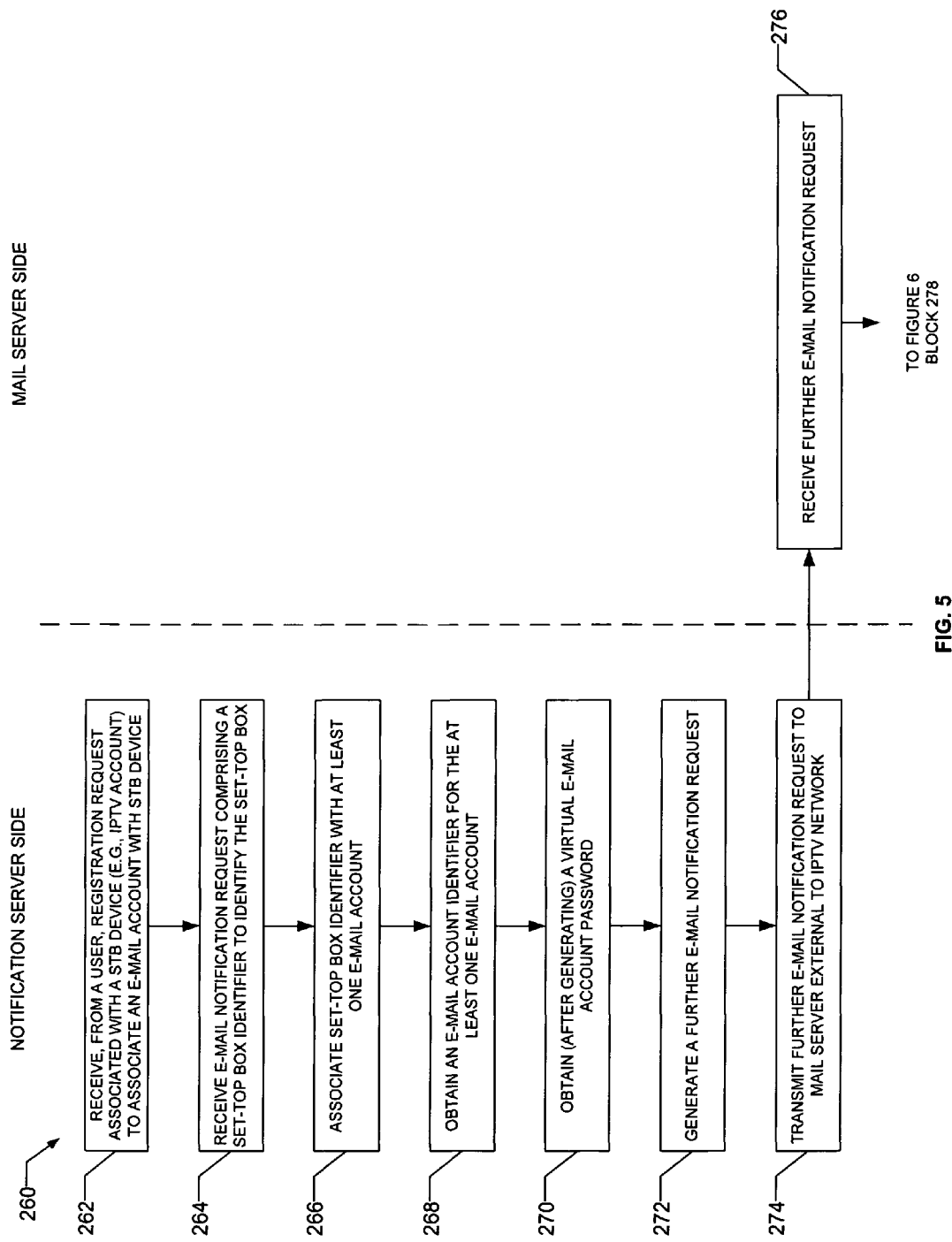
FIG. 5 and FIG. 6 show a detailed flow chart to illustrate a method to deliver a notification of receipt of an e-mail, in accordance with a further example embodiment.
Figure 6:
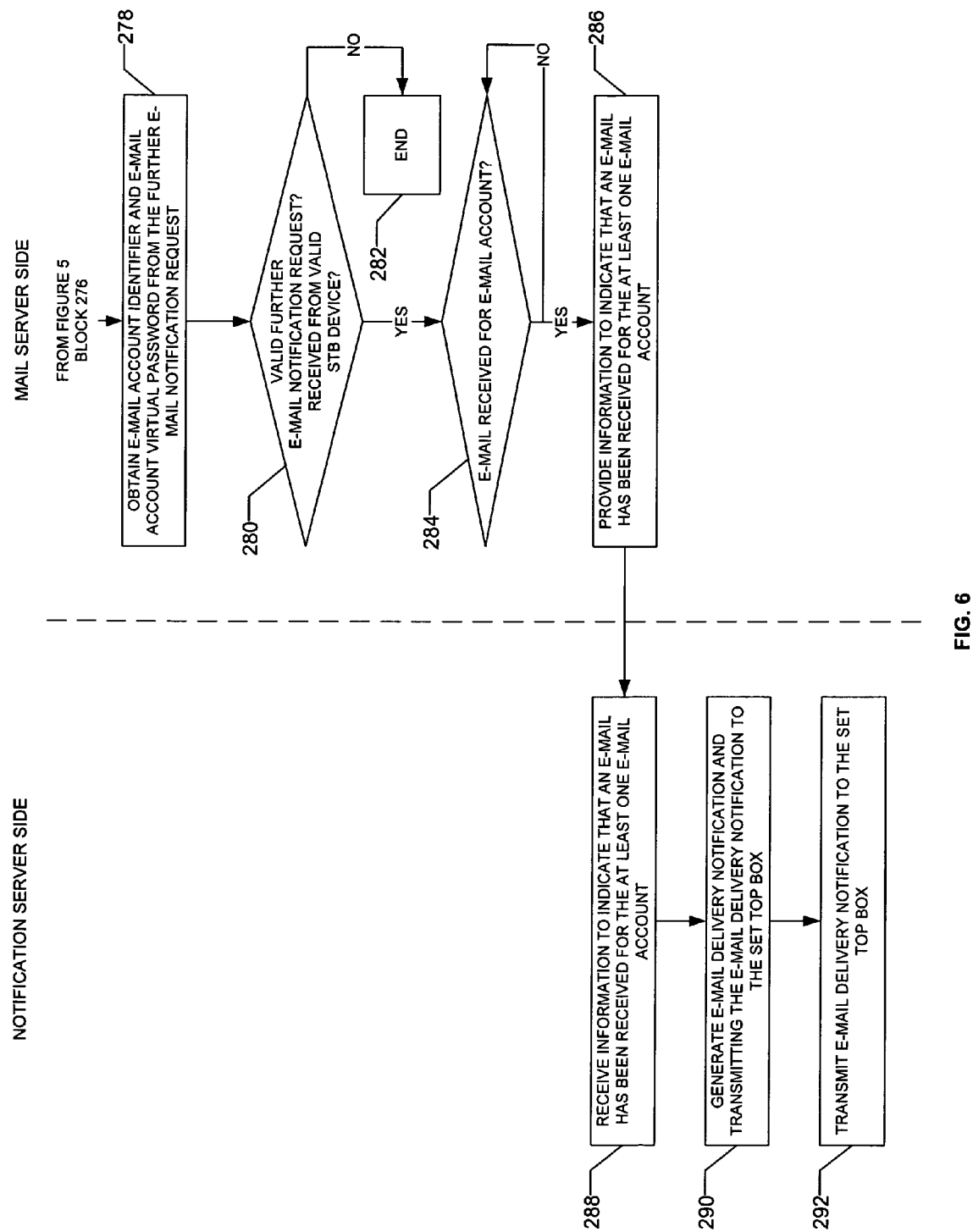

FIG. 5 and FIG. 6 show a detailed flow chart to illustrate a method 260 to deliver a notification of receipt of an e-mail, in accordance with example embodiment. In one example embodiment, the method may be implemented by the notification server 182 and mail server described according to FIG. 1 and FIG. 2. FIG. 5 and FIG. 6 show the operations of the method divided between the operations of the notification server 182 and the operations of the mail server 184.

In a non-limiting example embodiment, the method 260 may start with the receipt of a registration request from a user associated with a set-top box device, e.g., set-top box device 124 (block 262). This registration request may be received by the registration module 212 and is to associate an e-mail account, which may be an additional e-mail account, with the set-top box device 124 associated with the user. The registration request may, in one embodiment, identify an IPTV account of the user from which the identity management module may be able to identify one or more set-top boxes to be associated with the IPTV account. For example, although the user's e-mail account may automatically be associated with the set-top box 124, a need may exist to associate additional e-mail accounts with the set-top box device 124, thereby to also receive e-mail delivery notifications for the other e-mail accounts. The operation shown by block 262 may include providing the notification server with password details and other information which may be necessary to authenticate that the additional e-mail account is a valid e-mail account and that the owner of the e-mail account has given permission for the additional e-mail account to form part of the e-mail notification process. The details of the additional e-mail account, e.g., an e-mail account identifier, which is associated with the set-top box device 124, may be stored in the LDAP 202.

Similar to block 242 of FIG. 4, block 264 of FIG. 5 shows that an e-mail notification request is received by an identity management module 200 from the set-top box device 124, which forms part of the IPTV network or system 100. The e-mail notification request may comprise a set-top box identifier (or alternatively an IPTV account identifier identifying an IPTV account having a number of set-top box identifiers associate therewith) to identify the set-top box device 124. The identity management module 200 now associates the set-top box identifier (or the IPTV account identifier) with at least one e-mail account (shown by block 266), and by associating the set-top box identifier with the e-mail account, the identity management module 200 obtains an e-mail account identifier for the e-mail account (shown by block 268), as well as an e-mail account virtual password (shown by block 270). The identity management module 200 is able to do this association by accessing the LDAP 202.

As mentioned, the e-mail account virtual password may be generated by a virtual password generator module 204 in response to the identity management module 200 associating the set-top box identifier with an e-mail account. The virtual password may be in the form of a token and is used to provide the mail server 184 with authorization to access the relevant e-mail account thereby to determine whether any e-mails have been received at the mail server 184 for the e-mail account.

As indicated by block 272, the e-mail access module 206 generates a further e-mail notification request which may include both the e-mail account identifier and the e-mail account virtual password. This further e-mail notification request is transmitted to the mail server 184 which is external to the IPTV network 100 (shown by block 274). The further e-mail notification request instructs the mail server 184 to determine whether any e-mail has been received for the at least one e-mail account.

In one example embodiment, the mail server 184 receives the further e-mail notification request, as indicated by block 276 of FIG. 5. Block 278 of FIG. 6 shows that the mail server 184 obtains the e-mail account identifier and the e-mail account virtual password by extracting them from the further e-mail notification request. The mail server 184 uses the e-mail account identifier and the e-mail account virtual password to authenticate that the further e-mail notification request is a valid request and is received from a valid and authenticated set-top box device 124 (shown by block 280). As the e-mail notification request is automatically generated it would not include the e-mail password of the user. The e-mail account virtual password therefore provides the mail server 184 with information identifying that the request has been generated from a valid notification server 182 and not from an illegal source. If the further e-mail notification request is not valid or has not been received from a valid set-top box device 116, 124, the operation will end (shown by block 282).

Once the further e-mail request has been authenticated, the mail server 184 is to determine whether an e-mail has been received for the at least one e-mail account (shown by block 284). In an example embodiment, the mail server 184 accesses the e-mail account identified by the e-mail account identifier to check whether any new e-mails have been received.

As indicated by block 286 of FIG. 6, in the event that a new e-mail has been received at the mail server 184 for the e-mail account, the mail server will provide information to the notification server 182 to indicate that the e-mail has been received. As mentioned, this information may include any one or any combination of the name or e-mail address of the sender of the e-mail, the title of the e-mail, an indication on whether the e-mail has an attachment, the time the e-mail was received at the mail server or the first few words of the e-mail message.

The information provided by the mail server 184 is received by the notification server 182 (shown by block 288) and is used by the notification message generator module 208 to generate an e-mail delivery notification (shown by block 290). As indicated by block 292, the message transfer module 210 now transmits the e-mail delivery notification to the set-top box device 124 associated with the original mail notification request. The set-top box device 124 may then display the notification on the television monitor 126.

Figure 7:
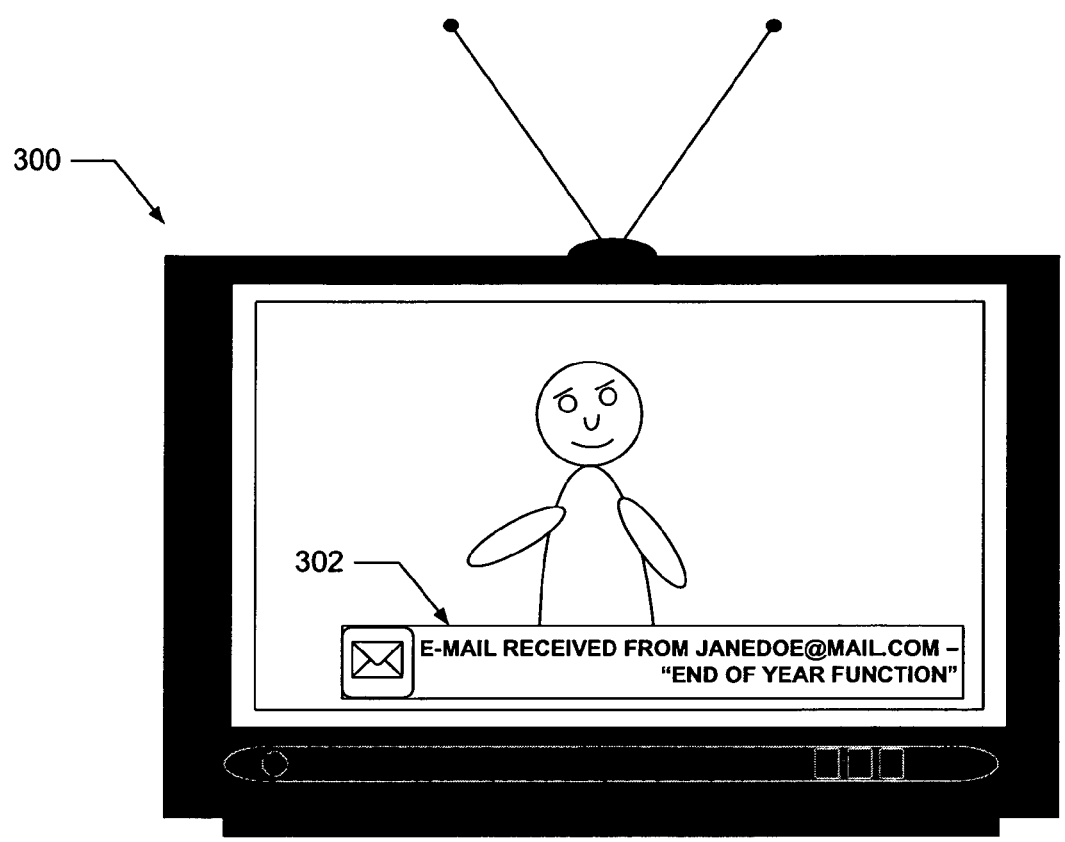
FIG. 7 is a diagrammatic presentation of a television monitor, displaying an e-mail delivery notification at the bottom end of the television monitor, in accordance with an example embodiment.

FIG. 7 is a diagrammatic presentation of a television monitor 300, e.g., television monitor 118 or 126 coupled respectively to set-top box devices 116 or 124. Reference numeral 302 indicates an e-mail delivery notification in accordance with an example embodiment, which is displayed on the television monitor 300. The e-mail delivery notification 302 comprises an envelope to indicate that an e-mail has been received for an e-mail account associated with the set-top box device. The e-mail delivery notification further indicates that the e-mail has been received from janedoe@mail.com and that the title of the e-mail is "End of year function". It will be appreciated that the e-mail delivery notification may scroll across the bottom end of the television monitor, or that it may pop-up on the television monitor 300 as a block, showing relevant details of the e-mail received.

Figure 8:
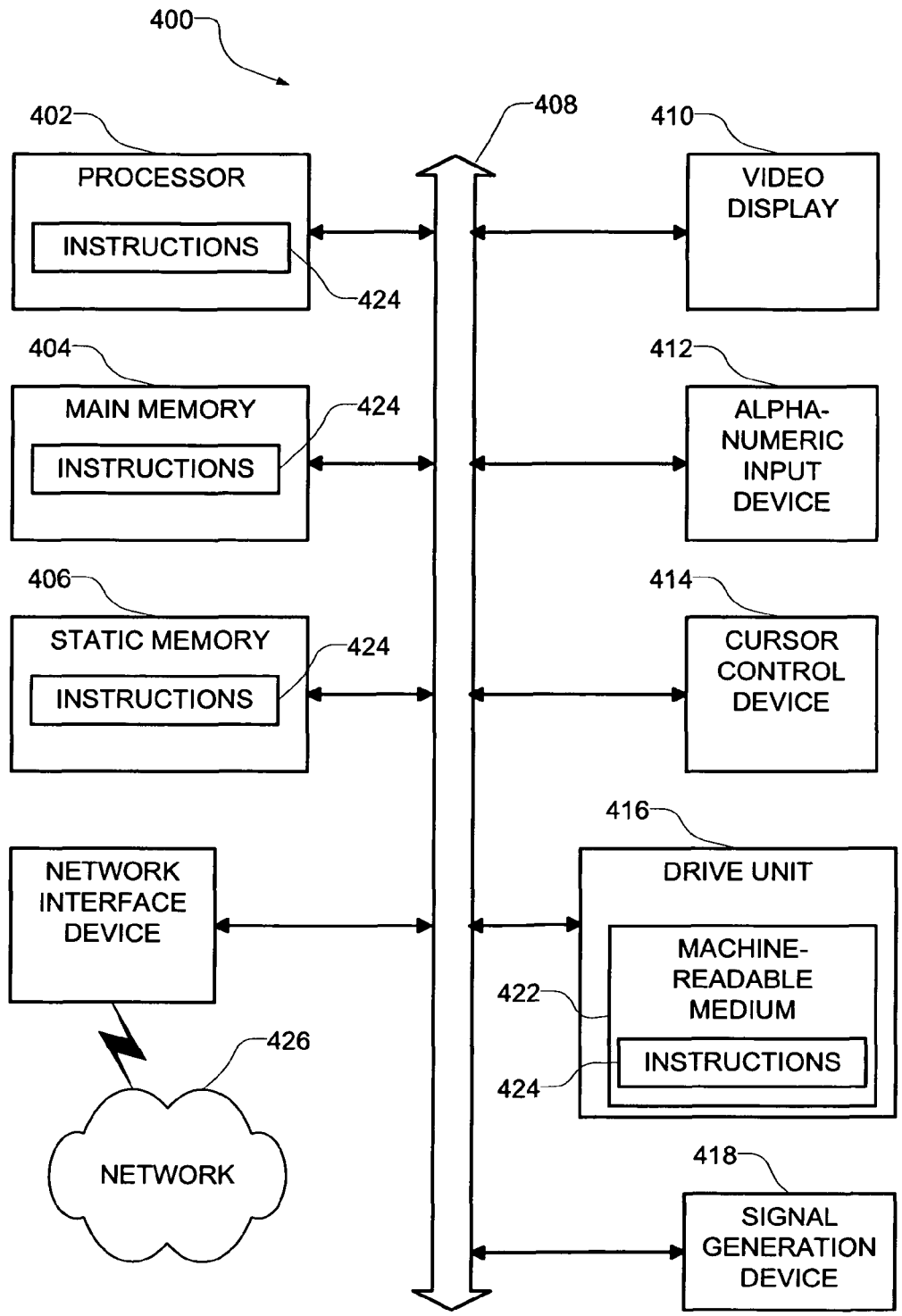
FIG. 8 shows a diagrammatic representation of machine in the example form of a set-top box within which a set of instructions, for causing the machine to perform any one or more of the methodologies discussed herein, may be executed.

FIG. 8 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories and optical and magnetic media.

What is claimed is:

1. A method for delivering a notification of receipt of an e-mail, the method comprising:
　　receiving from a set-top box device, at a notification server comprising a registration module and located remotely from the set-top box device, an e-mail notification request comprising a set-top box identifier associated with the set-top box device;
　　accessing, by the notification server, stored information that comprises a plurality of set-top box identifiers and that links respective set-top box identifiers with corresponding e-mail accounts;
　　determining, based on the stored information and the set-top box identifier, an e-mail account of a first user maintained at a mail server different from the notification server and external to an internet protocol television network;

determining, by the notification server, whether an e-mail has been received for the e-mail account at the mail server;

in response to determining that the e-mail has been received for the e-mail account:

generating an e-mail delivery notification; and transmitting, by the notification server, the e-mail delivery notification to the set-top box device associated with the e-mail notification request;

receiving, by the notification server, from the set-top box device, a registration request to register a second e-mail account of a second user by associating the set-top box identifier with the second e-mail account; and in response to the registration request, registering, by the registration module of the notification server, the second e-mail account by associating the second e-mail account with the set-top box identifier;

wherein the set-top box identifier is linked to an internet protocol television account identifier, and wherein determining the e-mail account of the first user includes associating the internet protocol television account identifier with the e-mail account.

2. The method of claim 1, further comprising:

generating and transmitting a second e-mail notification request to the mail server, the second e-mail notification request instructing the mail server to determine whether the e-mail has been received for the e-mail account; and receiving information from the mail server to indicate that the e-mail has been received for the e-mail account.

3. The method of claim 2, wherein determining the e-mail account of the first user comprises obtaining an e-mail account identifier for the e-mail account.

4. The method of claim 3, wherein the second e-mail notification request comprises the e-mail account identifier.

5. The method of claim 4, wherein determining the e-mail account of the first user comprises obtaining an e-mail account virtual password.

6. The method of claim 5, wherein the second e-mail notification request comprises the e-mail account virtual password.

7. The method of claim 6, further comprising authenticating that the e-mail notification request is a valid request and is received from a valid set-top box device.

8. The method of claim 6, further comprising receiving a second registration request from the first user to associate the e-mail account with the set-top box device.

9. A notification server to deliver a notification of receipt of an e-mail, the notification server comprising a memory, the notification server further comprising a registration module and a controller configured to:

receive from a set-top box device located remote from the notification server, an e-mail notification request comprising a set-top box identifier associated with the set-top box device;

access stored information that comprises a plurality of set-top box identifiers and that links respective set-top box identifiers with corresponding e-mail accounts;

determine, based on the stored information and the set-top box identifier, an e-mail account of a first user maintained at a mail server different from the notification server and external to an internet protocol television network;

determine whether an e-mail has been received for the e-mail account at the mail server;

generate an e-mail delivery notification in response to determining that the e-mail has been received for the e-mail account;

transmit the e-mail delivery notification to the set-top box device associated with the e-mail notification request;

receive, from the set-top box device, a registration request to register a second e-mail account of a second user by associating the set-top box identifier with the second e-mail account; and register the second e-mail account by associating the second e-mail account with the set-top box identifier in response to the registration request;

wherein the set-top box identifier is linked to an internet protocol television account identifier, and wherein the controller is adapted to determine the e-mail account of the first user by associating the internet protocol television account identifier with the e-mail account.

10. The notification server of claim 9, wherein the controller is adapted to:

generate and transmit a second e-mail notification request to the mail server external to the internet protocol television network, the second e-mail notification request instructing the mail server to determine whether an e-mail has been received for the e-mail account; and receive information from the mail server to indicate that an e-mail has been received for the e-mail account.

11. The notification server of claim 10, wherein the controller is adapted to obtain an e-mail account identifier for the e-mail account.

12. The notification server of claim 11, wherein the controller is adapted to generate the second e-mail notification request by including the e-mail account identifier in the second e-mail notification request.

13. The notification server of claim 12, wherein the controller is adapted to generate an e-mail account virtual password.

14. The notification server of claim 13, wherein the controller is adapted to generate the second e-mail notification request by including the e-mail account virtual password in the e-mail notification request.

15. The notification server of claim 14, wherein the mail server is adapted to authenticate that the e-mail notification request is a valid request generated for a valid set-top box device.

16. The notification server of claim 9, wherein the controller is adapted to receive a second registration request from the first user, the second registration request associating the e-mail account with the set-top box device.

17. A system to deliver a notification of receipt of an e-mail, the system comprising:

a memory;

a mail server external to an internet protocol television network, the mail server being configured to receive e-mails; and a notification server different from the mail server, the notification server comprising a registration module and being configured to:

receive an e-mail notification request comprising a set-top box identifier associated with a set-top box device, wherein the e-mail notification request is received from the set-top box device located remotely from the notification server;

access stored information that comprises a plurality of set-top box identifiers and that links respective set-top box identifiers with correspond e-mail accounts;

determine, based on the stored information and the set-top box identifier, an e-mail account of a first user maintained at the mail server;

determine whether an e-mail has been received for the e-mail account at the mail server;

generate an e-mail delivery notification in response to determining that the e-mail has been received for the e-mail account;

transmit the e-mail delivery notification to the set-top box device associated with the e-mail notification request;

receive, from the set-top box device, a registration request to register a second e-mail account of a second user by associating the set-top box identifier with the second e-mail account; and register the second e-mail account by associating the second e-mail account with the set-top box identifier in response to the registration request;

wherein the set-top box identifier is linked to an internet protocol television account identifier, and wherein the notification server is adapted to determine the e-mail account of the first user by associating the internet protocol television account identifier with the e-mail account.

18. The system of claim 17, wherein the notification server is adapted to:

generate a second e-mail notification request to be transmitted to the mail server to instruct the mail server to determine whether an e-mail has been received for the e-mail account; and receive information from the mail server to indicate that an e-mail has been received for the e-mail account;

and wherein the mail server is adapted to:

receive the second e-mail notification request;

and provide information to the notification server to indicate that an e-mail has been received for the e-mail account.

19. The system of claim 18, wherein the notification server is adapted to obtain an e-mail account identifier for the e-mail account.

20. The system of claim 19, wherein the notification server is adapted to generate the second e-mail notification request by including the e-mail account identifier in the second e-mail notification request.

21. The system of claim 20, wherein the notification server is adapted to generate an e-mail account virtual password.

22. The system of claim 21, wherein the notification server is adapted to generate the second e-mail notification request by including the e-mail account virtual password in the second e-mail notification request.

23. The system of claim 22, wherein the mail server is adapted to determine whether an e-mail has been received for the e-mail account by extracting the e-mail account identifier and the e-mail account virtual password from the second e-mail notification request.

24. A non-transitory machine-readable medium having program instructions stored thereon, that, in response to execution by a processor, cause the processor to perform operations comprising:

receive from a set-top box device identified by a set-top box identifier and located remotely from a computer, an email notification request comprising a set-top box identifier associated with a set-top box device;

access stored information that comprises a plurality of set-top box identifiers and links respective set-top box identifiers with corresponding email accounts;

determine, based on the stored information and the set-top box identifier, an e-mail account of a first user maintained at a mail server different from the computer and external to an Internet Protocol Television network, wherein the set-top box device forms part of the Internet Protocol Television network;

determine whether an e-mail has been received for the e-mail account at the mail server;

in response to determining that the e-mail has been received for the e-mail account, generate an e-mail delivery notification and transmit the e-mail delivery notification to the set-top box device associated with the email notification request;

receive, from the set-top box device, a registration request to register a second e-mail account of a second user by associating the set-top box identifier with the second e-mail account; and in response to the registration request, register the second e-mail account by associating the second e-mail account with the set-top box identifier;

wherein the set-top box identifier is linked to an Internet Protocol Television account identifier, and wherein the controller is adapted to determine the e-mail account of the first user by associating the Internet Protocol Television account identifier with the e-mail account.

\* \* \* \* \*